US009512585B1

(12) United States Patent
Miller et al.

(10) Patent No.: US 9,512,585 B1
(45) Date of Patent: Dec. 6, 2016

(54) ON-BOARD RE-INFLATABLE CONTAINMENT BOOM SYSTEM AND METHOD

(71) Applicants: Michael T Miller, Covington, LA (US); Terry Hall, Metairie, LA (US)

(72) Inventors: Michael T Miller, Covington, LA (US); Terry Hall, Metairie, LA (US)

(*) Notice: Subject to any disclaimer, the term of this patent is extended or adjusted under 35 U.S.C. 154(b) by 48 days.

(21) Appl. No.: 14/730,742

(22) Filed: Jun. 4, 2015

Related U.S. Application Data

(63) Continuation-in-part of application No. 12/902,282, filed on Oct. 12, 2010, now Pat. No. 9,206,575.

(51) Int. Cl.
*E02B 15/00* (2006.01)
*E02B 15/08* (2006.01)
*E02B 15/04* (2006.01)
*B65H 75/44* (2006.01)

(52) U.S. Cl.
CPC ....... *E02B 15/0864* (2013.01); *B65H 75/4484* (2013.01); *B65H 75/4486* (2013.01); *E02B 15/04* (2013.01); *E02B 15/047* (2013.01); *E02B 15/048* (2013.01)

(58) Field of Classification Search
CPC ............... E02B 15/06; E02B 15/0871; E02B 15/0828; E02B 15/08; E02B 15/0814; E02B 15/0864; E02B 15/04; E02B 14/047; E02B 15/048; B63B 25/082; B65H 75/4484; B65H 75/4486

USPC ............... 405/60, 63, 68, 69, 66, 62
See application file for complete search history.

(56) References Cited

U.S. PATENT DOCUMENTS

| 4,325,653 | A | 4/1982 | Teasdale |
| 4,964,758 | A | 10/1990 | Pekelny |
| 5,051,029 | A | 9/1991 | Ecker |
| 5,154,835 | A | 10/1992 | DeMichael |
| 5,810,512 | A | 9/1998 | Kateley |
| 7,833,416 | B1 | 11/2010 | Pozzi et al. |

FOREIGN PATENT DOCUMENTS

| WO | WO9209751 | 6/1992 |
| WO | WO2011163383 | 12/2011 |
| WO | WO2013162791 | 10/2013 |

*Primary Examiner* — Amber Anderson
*Assistant Examiner* — Patrick Lambe
(74) *Attorney, Agent, or Firm* — Keaty Law Firm LLC

(57) ABSTRACT

An on-board re-inflatable containment boom system for a waterborne vessel providing an on-board re-inflatable containment boom that lies substantially flat and capable of being spooled when deflated and floats in the proper orientation when inflated, that has re-inflatable float sections which are sequentially inflated during deployment and sequentially deflated during recovery, that can be repeatedly deployed and recovered for the purposes of training and testing, and that can be deployed immediately upon occurrence of an oil spill from a waterborne vessel because of its on-board location and its rapid deployment, providing controlled inflation and deflation during deployment and recovery, and a method for containment of an oil spill from a waterborne vessel using an on-board re-inflatable containment boom system.

19 Claims, 11 Drawing Sheets

2

ON-BOARD RE-INFLATABLE CONTAINMENT BOOM SYSTEM AND METHOD

CONTINUATION IN PART

This is a Continuation in Part claiming priority of pending U.S. patent application Ser. No. 12/902,282 filed 12 Oct. 2010, which is incorporated here by reference.

BACKGROUND OF THE INVENTION

This invention provides an on-board re-inflatable containment boom system for a waterborne vessel providing an on-board re-inflatable containment boom that can be repeatedly deployed and recovered for the purposes of training and testing, and that can be deployed immediately upon occurrence of an oil spill from a waterborne vessel, providing controlled inflation and deflation during deployment and recovery, and a method for containment of an oil spill from a waterborne vessel using an on-board re-inflatable containment boom system.

For many years conventional floating oil booms or barriers have been used in an attempt to contain floating material, such as hydrocarbons, on the surface, or just below the surface, of a body of water. Conventional floating booms are either housed on a shore based response vessel or on land usually miles or hours away from the spill site or shore-based facilities, or response vessels at a shore-based facility in a deflated state. When needed these booms are deployed by attaching the leading end of the boom to a deployment vessel which tows the boom into place and inflates the boom from the leading end. These booms are normally comprised of an elongated tubular body, sometimes sectioned into self-contained inflatable gas bladders, that is produced by the inflation of a sealed tube, or each inflatable gas bladder, to which an oil confining skirt or flap suitable for containing floatable material is attached. See for example U.S. Pat. Nos. 2,682,151 and 3,494,132 which disclose a series of plastic tubes which are interconnected by sleeves with the plastic tubes then being inflated to achieve the inflated state. Also, see for example U.S. Pat. No. 4,325,653 that discloses dual inflatable tubes with a skirt in between with said inflatable tubes being inflated with external inflatable gas hoses.

Also, see U.S. Pat. No. 4,123,911 which discloses a gas-inflatable boom wherein a single inflatable boom is inflated from an inflatable gas supply on the deploying vessel. All the patents cited above contemplate inflation from the leading edge of the boom one section at a time and do not disclose any method of the continuous inflation of the boom from a single inflatable gas source originating at the lagging last-off section of boom that runs concurrently with the boom, nor do they disclose inflation from an inflatable gas source already connected to the boom prier to deployment.

U.S. Pat. No. 3,729,589 discloses a collapsible boom containing an individual inflation chamber, however each inflation chamber must be connected to an inflatable gas supply and inflated separately as the boom is deployed. This greatly increases the time and complexity of inflation and deployment. U.S. Pat. No. 3,729,589 makes no mention of an equalized, pressurized inflatable gas supply running concurrently with the boom to allow for rapid inflation.

U.S. Pat. No. 5,022,785 discloses a method wherein a reactant body is contained within the boom itself such that by mechanical action the reactants can be activated to release an inflating gas by chemical reaction. After inflation by chemical reaction of the reactant the boom is inflated with pressurized inflatable gas from the first off, or leading, end to ensure proper inflation. Thus the boom may only be used a single time and then must be replaced.

Both U.S. Pat. Nos. 5,022,785 and 5,346,329 disclose individualized compartments or compartments separated by valves for the purpose of preventing deflation of an entire section of boom. Neither of these patents discloses an inflatable gas being supplied to the individual compartment from an external, individualized source.

Thus the above patents and current practices employed to respond to discharges of floatable material on water surfaces, such as hydrocarbons, fail to disclose a rapidly deployable system incorporating a retaining boom that can be deployed from a single point without need for multiple power sources, which can withstand ruptures and leaks. The patents recited above also are restricted in the functional length of a single floating barrier, or boom, because they lack an inflatable gas delivery line that runs concurrently with the entire length of boom. Further, current methods and practices require that vessels for the deployment and inflation of the boom, containment machinery, and booms be transported, often from considerable distances, to the site of a discharge on the water. This delay results in increased, un-contained discharges of toxins onto the water. Consequently, it is an object of this present invention to provide for an on-site or on-board system that incorporates a power system and inflatable gas supply to the winch-reel assembly and boom that will allow rapid boom deployment, control of the winch-reel assembly and control, the rate of deployment of the boom from a reel or other storage area.

Another object of this invention is to provide for a power system for rewinding of deployed boom onto a reel or other storage area without interruption to already inflated areas of the boom.

Another object of this invention is to provide a floating barrier deployment system that can be deployed and inflated from a single point inflatable gas supply originating from the lagging, or last-off, end of the boom.

Still another object of this invention is to supply inflatable gas to the boom, or inflatable gas bladders or inflatable gas compartments within the boom, from an individualized inflation point directly associated with the specific boom for inflatable gas bladders or inflatable gas compartments within the boom, said inflatable gas supply originating from the inflatable gas delivery hose in the proximity of the lagging, or last-off, end of the boom and having an equalized internal pressure not exceeding the pressure containing capabilities of the boom, or inflatable gas bladders or inflatable gas compartments within the boom.

Still another object of this invention is to supply an inflatable gas to the boom, or inflatable gas bladders or inflatable gas compartments within the boom, from an individualized inflation point directly associated with the specific boom, or inflatable gas bladders or inflatable gas compartments within the boom, such that the inflatable gas is supplied through a hose running externally and concurrently with the boom. This design allows for the boom to be continuously inflated from an inflatable gas supply originating from the inflatable gas delivery hose in the proximity of the non-leading, or last-off, end of the boom.

Yet another object of this invention is to provide inflating medium, such as air, to inflate the floating barrier from a single point supply that can inflate the entire floating barrier and continuously maintain inflation of the floating barrier once deployed and inflated.

Yet another object of this invention is to provide for a containment system that can be rapidly transported via helicopter to a discharge site for rapid deployment.

Still another object of this invention is to provide a floating barrier deployment system and floating barrier that is not limited in the length of the floating barrier that can be deployed, inflated and maintained in an inflated state.

Furthermore, it is an object of this invention to provide a control mechanism for deployment, inflation and maintenance of a floating barrier that allows the operator to control, from a single point, the rate of deployment and inflation of a floating barrier.

Yet another object of this invention is to allow for a floating barrier deployment system and floating barrier to be housed on marine vessels or at stationary points, including without limitation docks, ports, shores, islands, seawalls, dikes, skimming vessels, barges, ocean going vessels, rescue vessels, drilling rigs, boats, pontoons and platforms, or in close proximity of the oil being transported, shipping lanes or stored in the event of a spill.

Yet another object of this invention is to allow for the deployment, inflation, maintenance and directional control of the deployed and inflated boom without the use of a secondary deployment vehicle.

Still another object of this invention is to allow for the directional control of the deployed, inflated boom without the benefit of a secondary deployment vessel.

Additionally, it is an object of this invention to deploy the containment system without requiring the use of electrical supply or electrical controls.

SUMMARY OF THE INVENTION

The present invention provides an on-board re-inflatable containment boom system for a waterborne vessel providing an on-board re-inflatable containment boom that lies substantially flat and capable of being spooled when deflated and floats in the proper orientation when inflated, that has re-inflatable float sections which are sequentially inflated during deployment and sequentially deflated during recovery, that can be repeatedly deployed and recovered for the purposes of training and testing, and that can be deployed immediately upon occurrence of an oil spill from a waterborne vessel because of its on-board location and its rapid deployment, providing controlled inflation and deflation during deployment and recovery, and a method for containment of an oil spill from a waterborne vessel using an on-board re-inflatable containment boom system.

The on-board re-inflatable containment boom system adapts to changing circumstances of atmospheric pressure, air and water temperatures and turbulence, speed of deployment or recovery, and size of boom, and provides updated optimal positive and negative pneumatic pressures to facilitate operation without damage to the boom and without premature or delayed inflation or deflation.

The method for containment of an oil spill using an on-board re-inflatable containment boom system allows an immediate, effective response to an oil spill or other contaminate spill by utilizing a containment boom that is already on board a vessel, can be deployed very quickly, and can be deployed, recovered, and re-deployed many times, for training and testing of personnel and equipment, which leads to more effective responses to actual oil spills.

BRIEF DESCRIPTION OF DRAWINGS

Reference will now be made to the drawings, wherein like parts are designated by like numerals, and wherein.

DETAILED DESCRIPTION OF THE INVENTION

Figure 1:
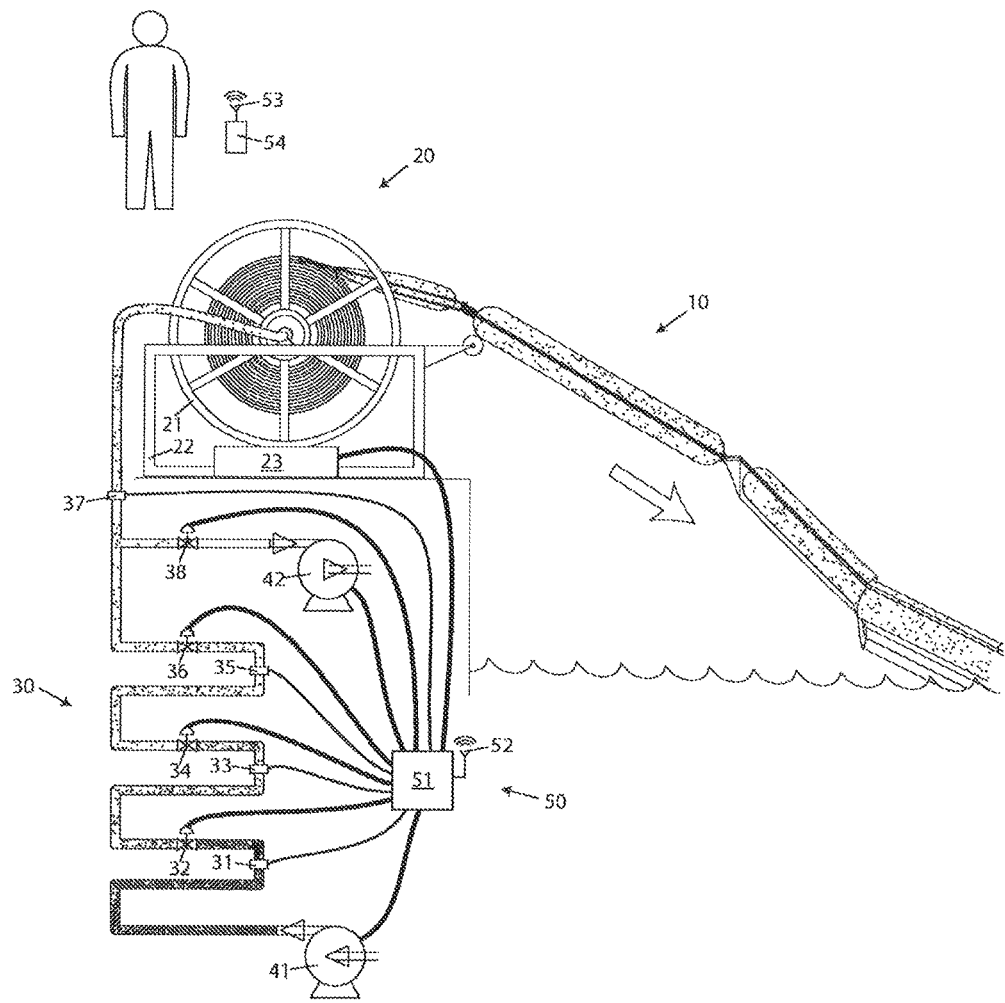
FIG. 1 is a schematic view of the invention being inflated and deployed.
Figure 8:
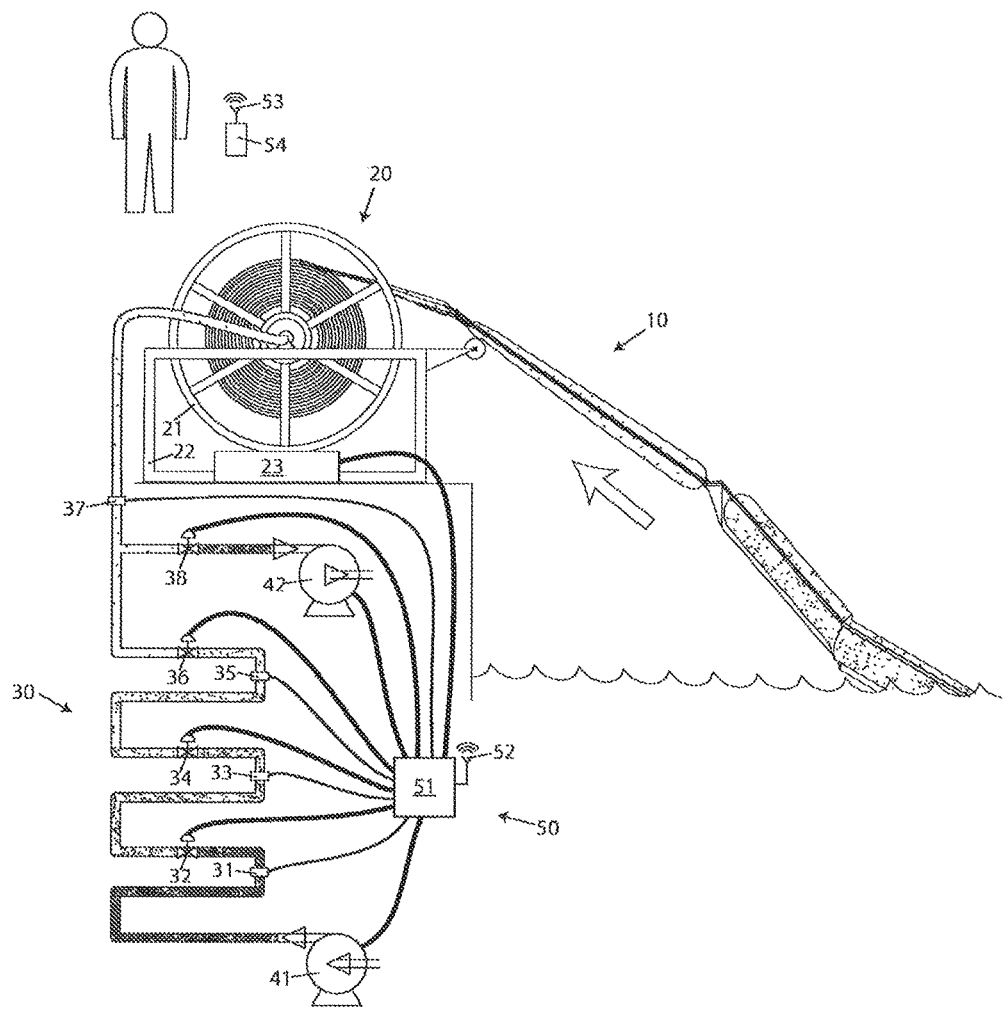
FIG. 8 is a schematic view of the invention being deflated and recovered.

Referring to FIG. 1 and FIG. 8, our invention provides an on-board re-inflatable containment boom system 100 with an on-board re-inflatable containment boom 10 capable of being deployed and recovered for training and testing purposes, and of being deployed in the event of an oil spill or similar floating contamination of water, under the control of a control system 50 monitored and controlled by an operator through a control display 54. The system further comprises a mountable reversible boom deployment unit 20 with mountable spools of deflated boom 21 on a spool-mounting frame 22, deployed and recovered by the operation of a spool motor 23. Deployment and recovery is automatically coordinated with inflation and deflation of the on-board re-inflatable containment boom 10 as it comes off of or goes back onto the spool 21 by operation of a pneumatic control pathway 30 modulating a compressed air source 41 and a vacuum source 42 and having pressure sensors 31, 33, 35, 37 and pressure-controlling valves 32, 34, 36, 38 providing data to, and being controlled by, the control manifold 51 of the control system 50.

Figure 11:
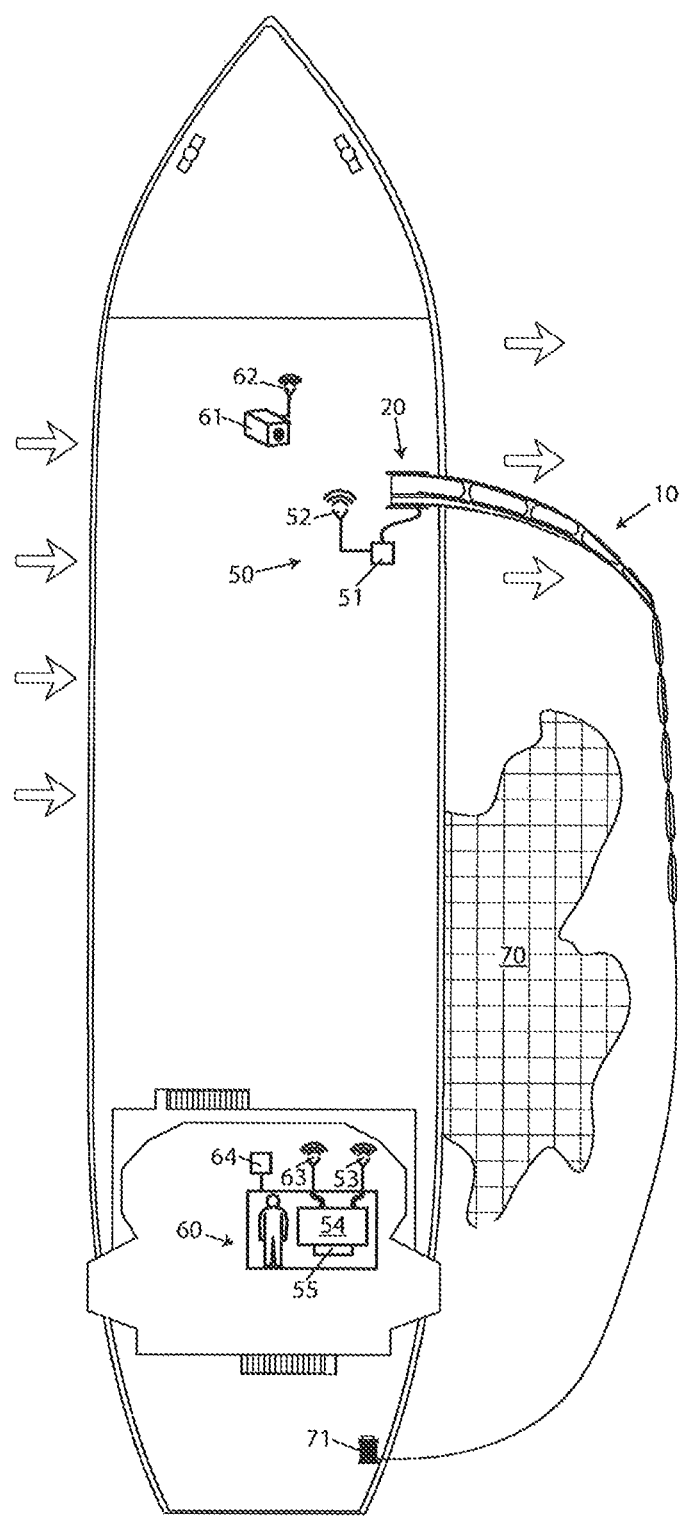
FIG. 11 is a schematic view of the invention in use in a favorable current.
Figure 12:
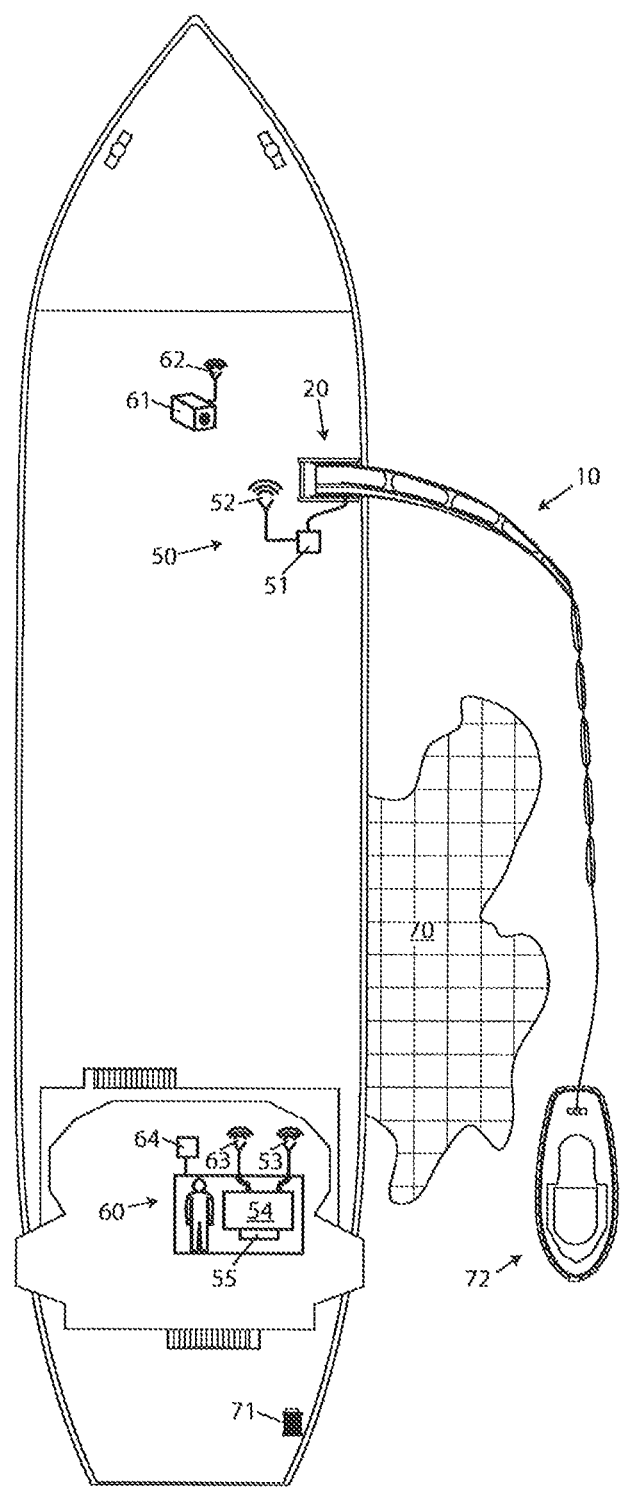
FIG. 12 is a schematic view of the invention in use in an unfavorable current.

Referring to FIG. 11 and FIG. 12, our method for containment of an oil spill from a waterborne vessel using an on-board re-inflatable containment boom system 100 provides an on-board re-inflatable containment boom 10, a mountable reversible boom deployment unit 20, under the control of a control manifold 51 in a control system 50 monitored and controlled by an operator through a control display 54, where spilled oil 70 or other contaminates can be immediately contained by deployed and inflated containment boom that can be positioned by a winch 71 under favorable current and wind conditions or by an assist vessel 72 under more challenging conditions.

Figure 3:
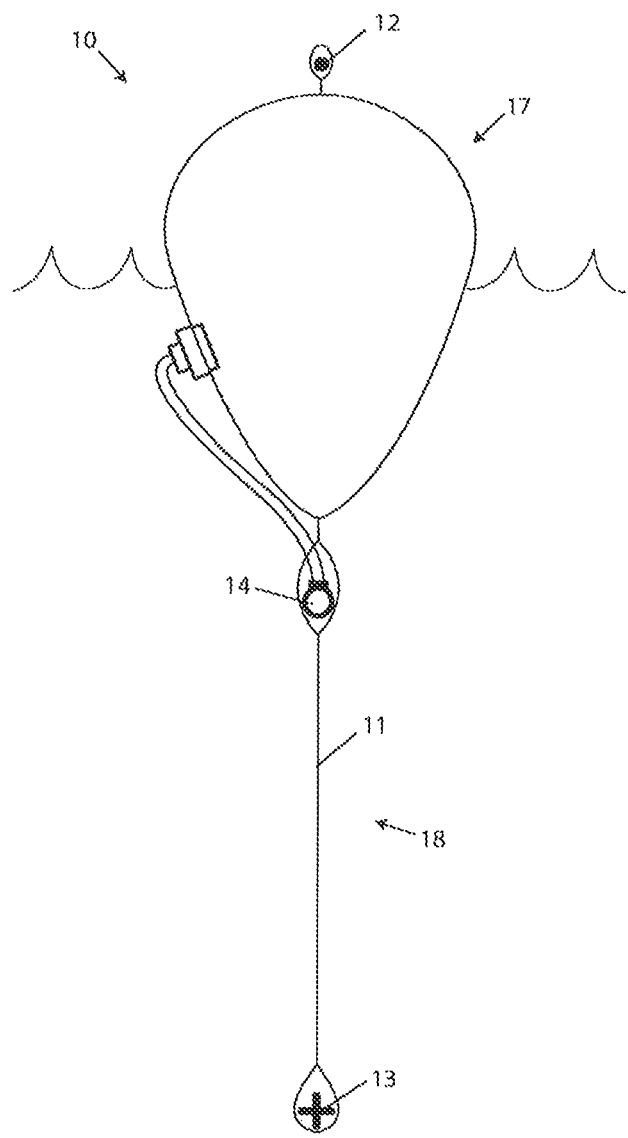
FIG. 3 is a cross-section view of the re-inflatable containment boom of the invention inflated.
Figure 4:
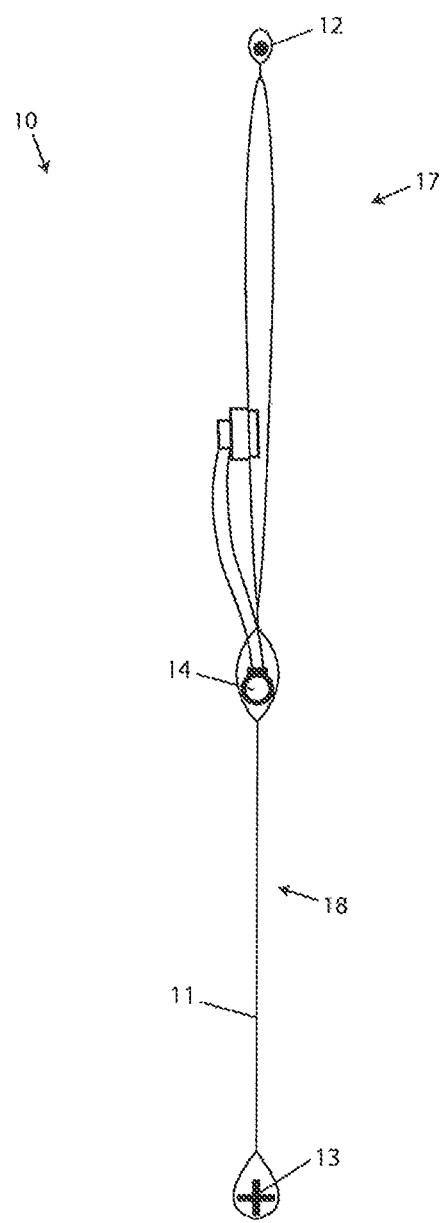
FIG. 4 is a cross-section view of the re-inflatable containment boom of the invention deflated.

Referring to FIG. 3 and FIG. 4, the on-board re-inflatable containment boom 10 has re-inflatable float sections 17 which are sequentially inflated during deployment and sequentially deflated during recovery, causing the containment boom to float in the proper orientation when inflated, with the containment skirt 18 suspended below the surface of the water, and causing the containment boom to lie substantially flat and capable of being spooled and stored when deflated. When deployed, the containment boom sits in a substantially vertical orientation with an upper edge and an upper portion lying above the waterline, and a lower edge and a lower portion lying below the waterline.

The upper-to-lower dimension of the re-inflatable containment boom 10, and the dimensions of the re-inflatable float sections 17 and the containment skirt 18 will depend upon the nature and conditions of the body of water, the work being performed, and the possible oil or contaminate spillage that might be encountered. Deeper offshore water and larger waves will require a longer skirt and proportionately larger float sections than shallower near-shore or inland water will, generally. In a preferred embodiment, the upper-to-lower dimension of the re-inflatable containment boom is between 3 feet and 5 feet, inclusive, with the containment skirt comprising very roughly 60 percent of that distance, and the float sections, when deflated, comprising most of the remainder of that distance.

Figure 2:
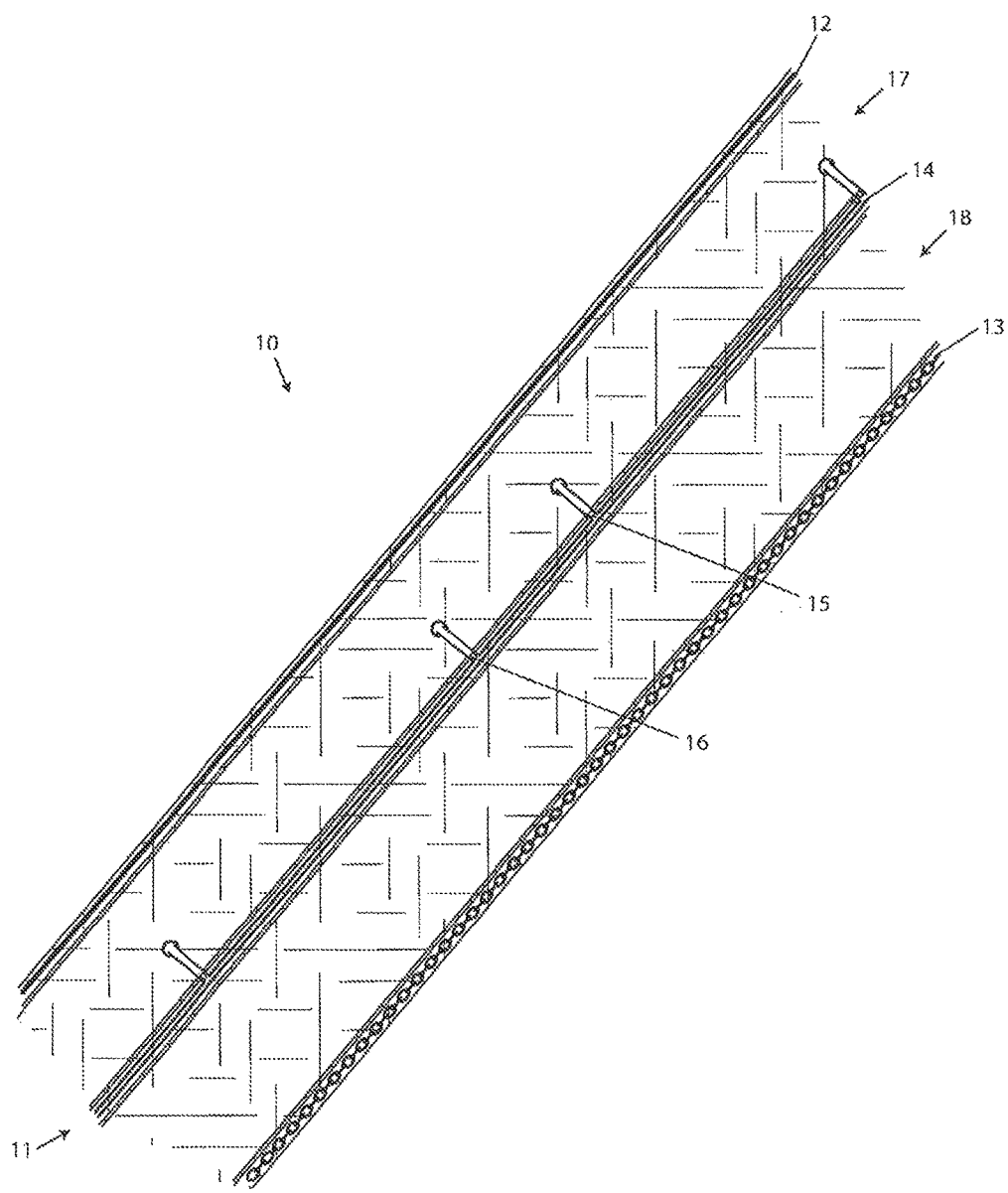
FIG. 2 is a partially cutaway view of the re-inflatable containment boom of the invention.

Referring to FIG. 2, the re-inflatable containment boom 10 is constructed from a flexible non-permeable sheet material 11 such as a polymeric plastic. The sheet material should be waterproof, petrochemical-proof, dispersant and solvent-proof, and should hold air pressure. Creation of the re-inflatable float sections 17 from a double thickness of sheet material can be accomplished by making heat-welded or solvent-welded seams, or by gluing. The sheet material and the seams forming the float sections should be capable of holding air pressure in the range of from 1 to at least 6 p.s.i. without bursting or otherwise failing, and a failure threshold of 10 p.s.i. would be desirable to provide a large margin of error.

A portion of the flexible non-permeable sheet material 11 forms the containment skirt 18 of the re-inflatable containment boom 10.

A control rope 12, ballast chain 13, and incorporated air hose 14 are attached either onto or within channels constructed into the flexible non-permeable sheet material 11 forming the re-inflatable containment boom 10. In a preferred embodiment, all three are contained in separate channels formed by seaming an additional layer of sheet material, either by folding the sheet material against itself, or by adding a new strip of sheet material.

The control rope 12 is a primary strength and control member of the containment boom, is attached onto or within a channel at the upper edge, and sits on top of the containment boom when deployed, so that the deployed containment boom can be manipulated and moved as needed. Because the control rope sits on top of the float sections, the use of a lighter-weight material or even of a buoyant material for the control rope is beneficial as long as it possesses sufficient tensile strength.

The ballast chain 13 provides a secondary strength and control member and provides adequate ballast weight to pull the containment skirt 18 downward under water when deployed. A non-buoyant cable or rope which is heavy or heavy when wet can be used as a ballast chain. The weight of the ballast chain should not be so great as to submerge the inflated float sections when deployed. The buoyancy of the inflated float sections will vary with the size and intended use of a given length of containment boom, and an optimal weight for ballast chain can be determined in relation to such buoyancy.

The incorporated air hose 14 attached either onto or within channels constructed into the flexible non-permeable sheet material 11 forming the re-inflatable containment boom 10 runs the length of the containment boom, and has connectors at each end which allow separate long lengths of containment boom to be coupled to each other. The incorporated air hose should be capable of delivering positive air pressure of at least 6 p.s.i., optimally 10 p.s.i., over a long run of at least several hundred feet, and of withstanding a vacuum or negative air pressure of at least −10 p.s.i. without collapsing. In a preferred embodiment, the incorporated air hose 14 is placed at the bottom of the float sections 17 and near the middle portion of the containment boom 10, to avoid solar heating or cooling variations and to take advantage of being surrounded by relatively constant water temperatures.

Figure 5:
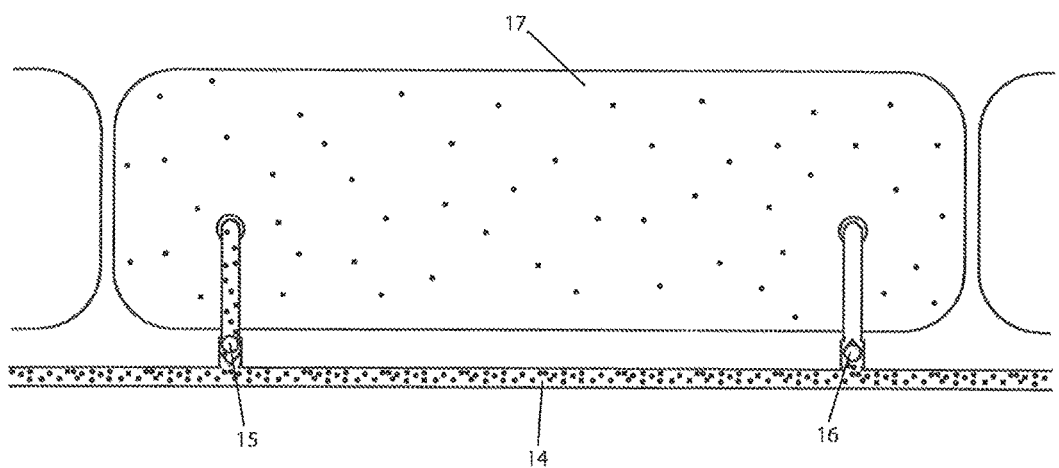
FIG. 5 is a schematic view of the filling and emptying valves of the re-inflatable containment boom of the invention being inflated.
Figure 6:
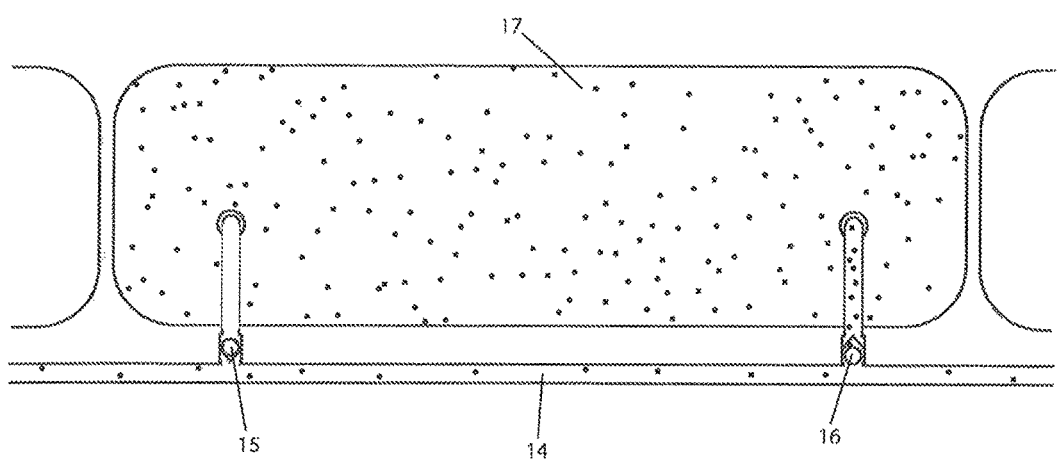
FIG. 6 is a schematic view of the filling and emptying valves of the re-inflatable containment boom of the invention being deflated.
Figure 7:
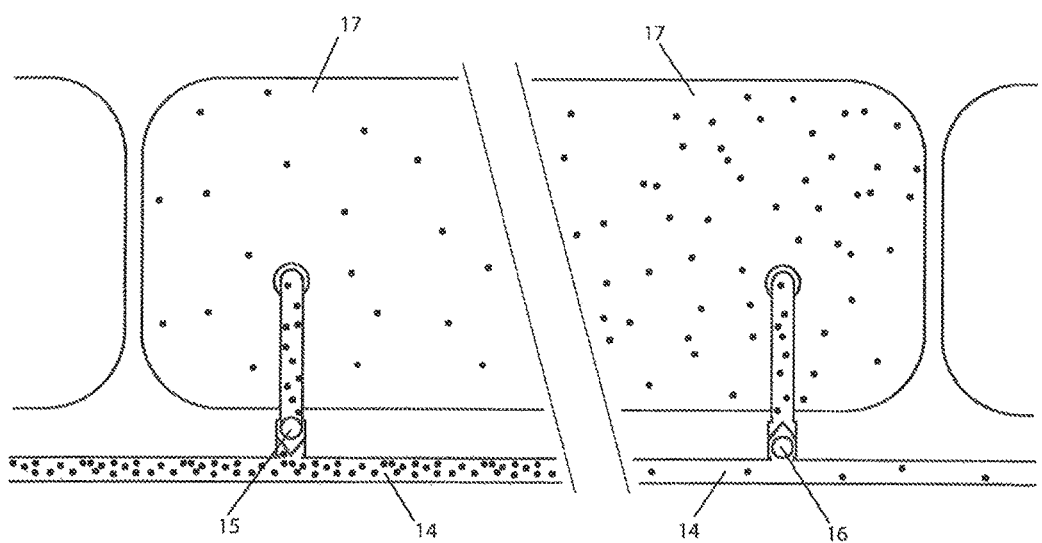
FIG. 7 is a schematic view of the filling and emptying valves of the re-inflatable containment boom of the invention in use.

Referring additionally to FIG. 5, FIG. 6, & FIG. 7, each re-inflatable float section 17 is in pneumatic connection with the incorporated air hose 14 through a filling valve 15 and an emptying valve 16. Both valves are pressure-calibrated one-way or check valves, which can be physically separate, can be housed in a common casing, or can be a combination valve performing the two functions. The filling valve 15 and the emptying valve 16 each respond to pressure differentials of different preset thresholds between the pressure in the incorporated air hose 14, which is substantially the same all along the long run of the incorporated air hose, and the internal air pressure in each individual float section 17.

The filling valve 15 allows the entry of air from the incorporated air hose 14 into the float section 17 up to a closing threshold of the target optimal pressure for the float section, where the float section is sufficiently buoyant but not in danger of bursting or otherwise failing from over pressure. This target optimal pressure will vary with the dimensions of containment booms for different uses and conditions. In a preferred embodiment, for a containment boom of deployed vertical length of 3 feet to 5 feet, the target optimal pressure for the floating sections is from 1 to 6 p.s.i., more preferably from 2.5 to 5 p.s.i. Therefore the closing threshold of the filling valve would be from 2.5 to 5 p.s.i.

The emptying valve 16 allows evacuation of the air from a float section when a vacuum or negative air pressure over an opening threshold is created in the incorporated air hose 14, but does not allow air to escape from a float section that is properly inflated at the target optimal pressure when there is only a small differential in pressure between the float section and the air hose. The emptying valve also acts as a safety release valve to release pressure from a float section that might be experiencing an overpressure condition resulting from something such as solar heating, as long as the pressure in the air hose is not similarly overpressured, and therefore a pressure differential exceeding the opening threshold exists. The opening threshold pressure differential should be from 2 to 3 times the target optimal pressure for the float section, therefore, in a preferred embodiment, from 5 to 15 p.s.i.

Referring again primarily to FIG. 1 (deployment) and FIG. 8 (recovery) the deflated, un-deployed containment boom is stored upon and deployed and recovered from a mountable reversible boom deployment unit 20 comprising a mountable spool of deflated boom 21 on a spool-mounting frame 22 driven at variable controllable speeds in outbound and inbound directions by a spool motor 23. Each mountable spool of deflated boom 21 contains a long length of containment boom, varying according to size of boom needed for specific conditions and size and weight consideration for the boom deployment unit on the deck of a specific vessel. More than one spool of deflated boom is anticipated to be carried on a vessel, so that multiple spools of boom can be deployed or recovered consecutively. The leading and trailing edges of the containment boom on any given spool of deflated boom are fitted with standard connector fittings known in the art and approved by overseeing entities, allowing multiple spooled sections of boom to be physically connected edge to edge, and pneumatically connected air hose to air hose. In a preferred embodiment, each mountable spool of deflated boom 21 is approximately 6 feet in diameter and deep enough to accommodate the 3 to 5 feet dimension of the deflated boom.

When a spool of deflated boom 21 is mounted on the spool-mounting frame 22 the standard pneumatic connector on the incorporated air hose 14 at the center of the spool, at the trailing edge of that length of containment boom, is connected to the pneumatic control pathway 30 which supplies the incorporated air hose, and the entire length of any connected incorporated air hoses, with variable and controlled positive and negative air pressures.

Positive air pressures are obtained from a compressed air source 41, which could be a vessel's common compressed air supply or a dedicated air compressor, and a vacuum source 42, which could be a vacuum pump. The initial supply of compressed air should be at relatively high pressure in order to ensure a steady flow of lower pressure into the incorporated air hose of a section of containment boom being deployed.

In a preferred embodiment, having a target optimal pressure of 3 p.s.i., the deflated containment boom 10 while still wrapped on the spool 21 will not tend to inflate when the incorporated air hose 14 contains a positive 3 p.s.i. of air pressure because that low level of pressure cannot overcome the pressure of even a fairly loose wrapping on the spool. As the deflated containment boom comes off of the spool during deployment, each consecutive float section 17 will quickly accept 3 p.s.i. of air pressure through that section's filling valve 15. An adequate flow of air is needed at that stage in order to quickly fill that section to capacity before or just as that section goes into the water. After the initial deployment, individual float sections will be subject to fluctuations in pressure due to warming or cooling effects of sun, air, and water. If a float section's pressure goes below the closing threshold of the filling valve 15, which is the target optimal pressure, 3 p.s.i. for this embodiment, the filling valve will open and accept air from the incorporated air hose 14, which is maintained at optimal pressure or 3 p.s.i. during the time the containment boom is in the water. If a deployed float section's pressure goes above the optimal pressure in the incorporated air hose to double or triple the optimal pressure, or 6 to 9 p.s.i. here, the emptying valve 16 will open because the pressure-differential threshold will have been reached, and the excess pressure from that section will go into the lower-pressure incorporated air hose.

During recovery, a negative air pressure or vacuum is applied to the incorporated air hose 14, of a magnitude of at least the emptying valve pressure-differential threshold plus the target optimal pressure, so that a float section at, say, a half-pound of pressure would still be further emptied because its emptying valve will still be open. As recovered containment boom is wound back onto the spool, the consecutive float section closest to the spool will most readily give up air to the vacuum applied to the incorporated air hose and will collapse to be re-wound flat on the spool. The vacuum will weaken at points further down the still-deployed containment boom, because the air given up by the closest float sections will weaken it, and the still-deployed containment boom will not lose its buoyancy while still in the water, which would make recovery more difficult.

In order to ensure the quick inflation and deflation of float sections before they go into and after they come out of the water, and to allow the containment boom to adjust to changing conditions while deployed, accurate and ongoing control and adjustment of the pressure or vacuum in the incorporated air hose 14 is required, and is supplied by the pneumatic control pathway 30 controlled by the control system 50.

The pneumatic control pathway 30 has at least one pressure sensor 37, at a point closest to, and at equal pressure with, the incorporated air hose 14, at least one pressure regulating valve 32, 34, 36 to reduce higher pressures to lower pressures having a sufficiently high flow rate, and at least one vacuum and release valve 38 to bleed off any high back pressure and to apply negative pressure for deflation. In a preferred embodiment, the pneumatic control pathway 30 steps the air pressure down in 2 stages and then releases low pressure into the incorporated air hose in another separate stage, comprising a high pressure sensor 31, a high-to-medium pressure air valve 32 to step the pressure down, a medium pressure sensor 33, a medium-to-low pressure air valve 34 to step the pressure down further, a low pressure sensor 35, a low pressure air valve 36 to release low pressure into the incorporated air hose, an incorporated-air-hose pressure sensor 37 constantly monitoring the actual pressure at the incorporated air hose, including any back pressure from deployed sections of boom, and a vacuum and release valve 38 for bleeding off any excess pressure and for applying negative pressure either for extreme pressure corrections or for deflating and recovering containment boom.

The control system 50 automatically controls the pneumatic control pathway 30 in coordination with the rate that containment boom is deployed out or recovered in by the speed and direction of the spool motor 23. The desired direction and speed of the spool motor, and therefore the desired rate of deployment or recovery, is ultimately set by an operator, through a control display 54. To the extent that the operator-set speed can be realized, and responding to changing conditions such as changes in the air supply or changes in the incorporated-air-hose pressure caused by, say, transition between air at one temperature and water at another temperature, or failure of an individual float section, the control system 50 finely adjusts the speed of the spool motor in coordination with adjustments of the applied positive or negative air pressures from the pneumatic control pathway 30, resulting in the proper quick inflation or deflation of the appropriate float sections 17 before those sections go into or after those sections come out of the water, avoiding the undesirable sinking effects of deploying boom with under-pressured float sections into the water or recovering boom with under-pressured float sections from the water.

The control system 50 comprises a control manifold 51 in communication with a control display 54 through which an operator can exert control over deployment or recovery and can monitor the deployment or recovery operations. In a preferred embodiment, such bidirectional control communication is implemented as wireless signals through a control manifold antenna 52 and a control display antenna 53.

Figure 9:
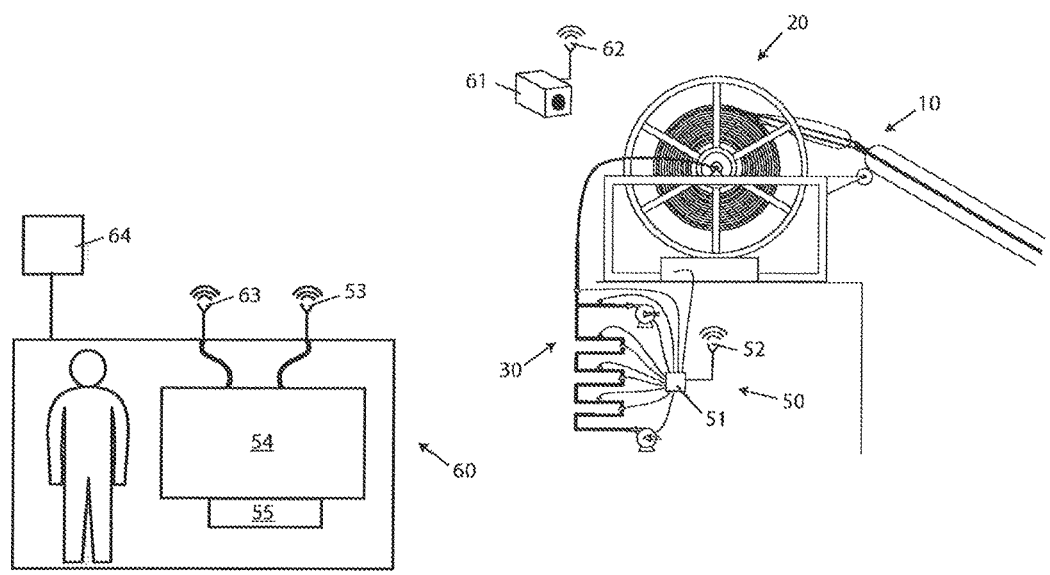
FIG. 9 is a schematic view of the control system of the invention in use.
Figure 10:
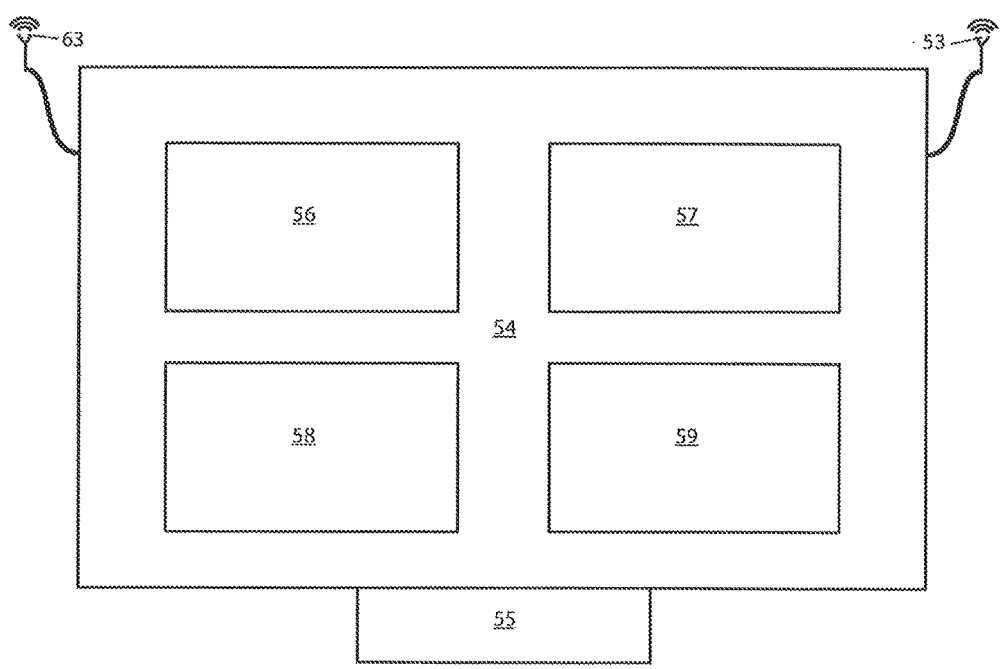
FIG. 10 is a schematic view of the control display of the invention.

Referring to FIG. 9 & FIG. 10, basic deployment and recovery operations can be managed through a few simple commands from the operator. But deployment of containment boom around an actual oil spill, and training and testing in preparation for an actual oil spill, is a serious undertaking subject to regulatory oversight and carrying a threat of severe penalties, and therefore justifies a greater amount of automatically assisted operator control, and a large amount of data reported and recorded or logged by the system. Such data can be used to analyze and improve training and testing, and in the event of an oil spill can be used to improve the effectiveness of the response in real time and to have a detailed record of the response for post-oil-spill analysis, investigations, or litigation.

In a preferred embodiment, a control house 60 is provided to house the control display 54 equipment and operator during all weather conditions. If the control house is remote from the mountable reversible boom deployment unit 20, an observation camera 61 having an observation camera transmit antenna 62 can be mounted at the deployment unit, with its video signal sent to be received by the observation camera receive antenna 63 at the control house 60. A weather station 64 reporting conditions can be included, too.

For full control, reporting, and recording of deployment or recovery operations, the control display 54 can have a control manifold keyboard 55 through which an operator can exert automatically assisted control of the operations, a control manifold display 56 reporting all or selected real-time data from the control manifold 51, an observation camera display 57 showing the operations in real time, a weather and conditions display 58, and logged-data display 59 showing real-time data as it is being recorded or showing logged data for reference or review.

In use, in a preferred embodiment where the target optimal pressure for the float sections 17 is 3 p.s.i., the closing threshold for the filling valves 15 is 3 p.s.i., and the opening threshold for the emptying valves 16 is 6 p.s.i., in a deployment operation an operator would initiate through the control display 54 the deployment of an already-mounted spool 21 of deflated containment boom 10. The control manifold 51 causes the spool motor 23 to rotate the spool in the appropriate direction at the desired speed, deploying the containment boom. Simultaneously, the control manifold 51 senses the pressure at a point 37 at equal pressure with the incorporated air hose 14, and senses the pressures at intermediate points 31, 33, 35 in the pneumatic control pathway 30. If activation of the compressed air source 41 is needed, such activation is performed. The control manifold adjusts any intermediate pressure control valve or valves 32, 34 in order to obtain an appropriate intermediate pressure at a point 35 on the higher-pressure side of the low pressure air valve 36, and opens the low pressure air valve to release the target optimal pressure of 3 p.s.i. into the point 37 in the pneumatic control pathway 30 at equal pressure with the connected incorporated air hose 14. The float section 17 at the leading edge of the unspooling containment boom, starting at essentially no pressure, begins quickly pressurizing because the filling valve 15 stays open and accepting air from the incorporated air hose until pressure in that float section reaches the closing threshold of 3 p.s.i. At that point, the leading-edge float section is properly pressurized and is close to entering or is just entering the water, and the inflating process is repeated for each consecutive float section coming off the spool.

For the deployed float sections of the containment boom already in the water, if the air pressure drops below 3 p.s.i., the filling valve will open again and accept air from the incorporated air hose 14, which is maintained at 3 p.s.i. If the air pressure in a float section increases up to the emptying valve 16 threshold opening pressure of 6 p.s.i above the incorporated air hose pressure of 3 p.s.i., which is a float-section pressure of 9 p.s.i., the emptying valve 16 will open and allow pressure to escape into the incorporated air hose. The occurrence of already-deployed float sections taking pressure from or adding pressure to the incorporated air hose 14 affects the pressure in the incorporated air hose as dips or surges in pressure, which are detected by the control manifold 51 through the sensor 37 at a point at equal pressure with the incorporated air hose. Dips of low pressure can be compensated for by the control manifold 51 further opening the low pressure air valve 36 plus any intermediate valves needed, increasing the air pressure in the air hose. Surges of high pressure can be released by the control manifold 51 opening the vacuum and release valve 38, briefly for bleeding off small surges to atmospheric pressure, or activating the vacuum source 42 to apply negative air pressure to any surge of sufficient magnitude to warrant such remediation.

After deployment is completed, pressure in the several float sections is maintained at between 3 and 9 p.s.i. through the operation of each float section's filling and emptying valves, with the incorporated air hose 14 maintaining a pressure of 3 p.s.i.

In use, in a recovery operation of a preferred embodiment having the same parameters, an operator would initiate recovery through the control display 54. The control manifold 51 causes the spool motor 23 to rotate the spool in the appropriate direction at the desired speed, recovering the containment boom. Simultaneously, the control manifold 51 closes the low pressure air valve 36 and adjusts any intermediate pressure control valve or valves 32, 34 as needed, and activates the vacuum source 42 if activation is needed. While sensing the pressure in the pneumatic control pathway 30 at a point 37 at equal pressure with the incorporated air hose 14, the control manifold opens the vacuum and release valve 38, which has a vacuum behind it, in a constantly adjusted amount sufficient to apply a steady negative air pressure of −7 p.s.i. to the incorporated air hose. That vacuum or negative pressure is sufficient to ensure the opening of each float section's emptying valve 16 at the threshold pressure differential of 6 p.s.i. By maintaining a steady negative air pressure of −7 p.s.i., the vacuum on the incorporated air hose at the float section closest to being re-wound on the spool is sufficient to deflate that float section, but the vacuum is weakened to less than 6 p.s.i. in the portions of the air hose more remote from the vacuum source, and no air is extracted from the more remote float sections still deployed in the water. The control manifold automatically coordinates the speed of the spool motor 23 with the amount of vacuum applied in order to ensure that the closer float sections are deflated without prematurely deflating more remote float sections still in the water.

Referring to FIG. 11 & FIG. 12, in the use of a preferred embodiment of the invention in containing spilled oil 70 from on board a waterborne vessel, a determination is first made whether current and wind conditions are such that deployed containment boom 10 will float in a favorable direction to be able to begin deploying the boom while retaining the leading end of a lead line aboard the vessel, floating the deployed containment boom around the spilled oil, and securing the lead line to a winch 71 in order to form a properly deployed boom. If current and wind conditions are not favorable to floating the boom around the spilled oil 70, then an assist vessel 72 can be used to tow the leading edge of the containment boom in the proper path to form a properly deployed boom.

Many changes and modifications can be made in the present invention without departing from the spirit thereof. We therefore pray that our rights to the present invention be limited only by the scope of the appended claims.

We claim:
1. An on-board re-inflatable containment boom system for a waterborne vessel, comprising: a length of re-inflatable containment boom made from a flexible non-permeable sheet material, having in relation to its deployment upper and lower edges and portions, comprising:
   a control rope incorporated into the upper edge;
   multiple re-inflatable float sections incorporated into the upper portion, each having a filling valve and an emptying valve;
   an incorporated air hose connected to all said filling valves and all said emptying valves of said re-inflatable float sections;
   a containment skirt formed by the lower portion, below said re-inflatable float sections;
   a ballast chain incorporated into the lower edge;
   where said re-inflatable containment boom lies substantially flat and capable of being spooled when deflated, and floats with the proper orientation of its upper and lower portions when inflated;
   a mountable, reversible and interchangeable boom deployment unit comprising:
   a mountable, removable and interchangeable spool of said re-inflatable containment boom in a deflated state;
   a spool-mounting frame supporting said mountable spool of said re-inflatable containment boom in a deflated state, allowing deployment with inflation and recovery with deflation of said re-inflatable containment boom;
   a spool motor connected to said mountable spool through said spool-mounting frame; where said spool motor is capable of rotating said mountable spool in both a deployment direction and a recovery direction at controlled variable speeds; a compressed air source adapted to provide sufficient air pressure and flow to rapidly inflate said re-inflatable containment booms;
   a vacuum source adapted to provide sufficient negative air pressure and flow to rapidly deflate said re-inflatable containment booms;
   a pneumatic control pathway comprising;
   a length of pneumatic tubing removably connectable to said incorporated air hose in said re-inflatable containment boom in said mountable spool, and having a spool-connection end, a high-compression end connected to said compressed air source, and a vacuum bypass between the two ends at a point at equal pressure with said incorporated air hose, connected to said vacuum source, comprising:
   at least one higher pressure sensor adapted to monitor pressure in said pneumatic control pathway at a point closer to said compressed air source;
   at least one pressure reducing air valve located in said pneumatic control pathway after said compressed air source and said higher pressure sensor, adapted to decrease pressure from higher to lower level;
   at least one air valve located in said pneumatic control pathway after said at least one pressure reducing air valve, adapted to control the release of low pressure into said incorporated air hose in said re-inflatable containment boom in said mountable spool;
   an incorporated-air-hose pressure sensor adapted to monitor pressure in said pneumatic control pathway at a point closest to, and at equal pressure with, said incorporated air hose in said re-inflatable containment boom in said mountable spool;
   a vacuum and release valve located in the vacuum bypass of said pneumatic control pathway at a point at equal pressure with said incorporated air hose in said re-inflatable containment boom in said mountable spool, adapted to apply negative pressure to, or release pressure from, said incorporated air hose;
   a control system adapted to coordinate operator-controlled speed of deployment and recovery of said re-inflatable containment boom with automatically controlled inflation and deflation through said incorporated air hose, comprising:
   a control manifold adapted to monitor and control said sensors, said valves, said spool motor, said compressed air source, and said vacuum source;
   a control display adapted to providing information to and accepting commands from an operator;
   a control manifold antenna and a control display antenna for data communication between said control manifold and said control display;
   where said control manifold monitors and adjusts the direction and speed of said spool motor according to operator commands, and monitors and adjusts the positive or negative pressure applied by said pneumatic control pathway to said incorporated air hose in said re-inflatable containment boom in said mountable spool;
   where said control manifold continually senses the rate at which said on-board re-inflatable containment boom is being deployed or recovered;
   where said control manifold continually senses the positive air pressure at intermediate points between said compressed air source and said pneumatic control pathway at a point at equal pressure with said incorporated air hose, and adjusts the air pressure at said intermediate points by controlling said valves regulating positive air pressure and flow in a stepping-down high-to-low pressure sequence;
   where said control manifold continually senses the air pressure in said pneumatic control pathway at a point at equal pressure with said incorporated air hose, and adjusts the air pressure by controlling said valves regulating positive air pressure and said vacuum and release valve regulating vacuum and pressure release, in order to provide adequate positive or negative pressure and flow for deployment or recovery while avoiding damaging overpressure conditions by releasing excess pressure or applying a vacuum;
   where said on-board re-inflatable containment boom system adapts to changing circumstances of atmospheric pressure, air and water temperatures and turbulence, speed of deployment or recovery, and size of boom, and provides updated optimal positive and negative pneumatic pressures to facilitate operation without damage to the boom and without premature or delayed inflation or deflation.

2. The on-board re-inflatable containment boom system of claim 1, where said pneumatic control pathway further comprises:
   a high pressure sensor adapted to monitor pressure in said pneumatic control pathway at a point closest to said compressed air source;
   a high-to-low pressure air valve located in said pneumatic control pathway after said compressed air source and said high pressure sensor, adapted to decrease pressure from high to low level;
   a low pressure sensor adapted to monitor pressure in said pneumatic control pathway at a point after said high-to-low pressure air valve;
   a low pressure air valve located in said pneumatic control pathway after said low pressure sensor, adapted to control the release of low pressure into said incorporated air hose in said re-inflatable containment boom in said mountable spool.

3. The on-board re-inflatable containment boom system of claim 1, where said pneumatic control pathway further comprises:
a high pressure sensor adapted to monitor pressure in said pneumatic control pathway at a point closest to said compressed air source;
a high-to-medium pressure air valve located in said pneumatic control pathway after said compressed air source and said high pressure sensor, adapted to decrease pressure from high to medium level;
a medium pressure sensor adapted to monitor pressure in said pneumatic control pathway at a point after said high-to-medium pressure air valve;
a medium-to-low pressure air valve located in said pneumatic control pathway after said medium pressure sensor, adapted to decrease pressure from medium to low level;
a low pressure sensor adapted to monitor pressure in said pneumatic control pathway at a point after said medium-to-low pressure air valve;
a low pressure air valve located in said pneumatic control pathway after said low pressure sensor, adapted to control the release of low pressure into said incorporated air hose in said re-inflatable containment boom in said mountable spool.

4. The on-board re-inflatable containment boom system of claim 1, where said control system further comprises a control house.

5. The on-board re-inflatable containment boom system of claim 1, where said control system further comprises a control manifold keyboard and control manifold display.

6. The on-board re-inflatable containment boom system of claim 1, where said control system further comprises an observation camera and observation camera display.

7. The on-board re-inflatable containment boom system of claim 1, where said control system further comprises a weather station and a weather and conditions display.

8. The on-board re-inflatable containment boom system of claim 1, where said control system further comprises a logged-data display.

9. The on-board re-inflatable containment boom of claim 1, where said flexible non-permeable sheet material is a polymeric plastic.

10. The on-board re-inflatable containment boom of claim 1, where said flexible non-permeable sheet material is capable of forming and holding strong heat-welded bonds.

11. The on-board re-inflatable containment boom of claim 1, where said flexible non-permeable sheet material is capable of forming and holding strong solvent-welded bonds.

12. The on-board re-inflatable containment boom of claim 1, where said control rope is a light-weight high-strength material.

13. The on-board re-inflatable containment boom of claim 1, where said control rope is a buoyant high-strength material.

14. The on-board re-inflatable containment boom of claim 1, where said multiple re-inflatable float sections incorporated into the upper portion are each between 3 feet and 30 feet long, inclusive, in the long dimension of said on-board re-inflatable containment boom, parallel with said control rope and said incorporated air hose.

15. The on-board re-inflatable containment boom of claim 1, where said filling valves and emptying valves are pressure-calibrated check valves.

16. The on-board re-inflatable containment boom of claim 1, where each pair of said filling valve and emptying valve are co-located in a single valve casing.

17. The on-board re-inflatable containment boom of claim 1, where said re-inflatable float sections have optimal deployed air pressure of between 1 to 6 p.s.i., inclusive, said filling valve has a closing threshold approximately equal to the optimal deployed air pressure, and said emptying valve has an opening threshold of a negative air pressure approximately equal in absolute value to the optimal deployed air pressure.

18. The on-board re-inflatable containment boom of claim 1, where the weight of the boom keeps the boom uninflated when the boom is on the reel.

19. A method for containment of an oil spill from a waterborne vessel, comprising: providing an on-board re-inflatable containment boom system, comprising:
a length of re-inflatable containment boom made from a flexible non-permeable sheet material, having in relation to its deployment upper and lower edges and portions, comprising:
a control rope incorporated into the upper edge;
multiple re-inflatable float sections incorporated into the upper portion, each having a filling valve and an emptying valve;
an incorporated air hose connected to all said filling valves and all said emptying valves of said re-inflatable float sections;
a containment skirt formed by the lower portion, below said re-inflatable float sections;
a ballast chain incorporated into the lower edge;
where said re-inflatable containment boom lies substantially flat and capable of being spooled when deflated, and floats with the proper orientation of its upper and lower portions when inflated;
a mountable reversible boom deployment unit comprising:
a mountable spool of said re-inflatable containment boom in a deflated state;
a spool-mounting frame supporting said mountable spool of said re-inflatable containment boom in a deflated state, allowing deployment with inflation and recovery with deflation of said re-inflatable containment boom;
a spool motor connected to said mountable spool through said spool-mounting frame;
where said spool motor is capable of rotating said mountable spool in both a deployment direction and a recovery direction at controlled variable speeds;
a compressed air source adapted to provide sufficient air pressure and flow to rapidly inflate said re-inflatable containment booms;
a vacuum source adapted to provide sufficient negative air pressure and flow to rapidly deflate said re-inflatable containment booms;
a pneumatic control pathway comprising;
a length of pneumatic tubing removably connectable to said incorporated air hose in said re-inflatable containment boom in said mountable spool, and having a spool-connection end, a high-compression end connected to said compressed air source, and a vacuum bypass between the two ends at a point at equal pressure with said incorporated air hose, connected to said vacuum source, comprising:

at least one higher pressure sensor adapted to monitor pressure in said pneumatic control pathway at a point closer to said compressed air source;

at least one pressure reducing air valve located in said pneumatic control pathway after said compressed air source and said higher pressure sensor, adapted to decrease pressure from higher to lower level;

at least one air valve located in said pneumatic control pathway after said at least one pressure reducing air valve, adapted to control the release of low pressure into said incorporated air hose in said re-inflatable containment boom in said mountable spool;

an incorporated-air-hose pressure sensor adapted to monitor pressure in said pneumatic control pathway at a point closest to, and at equal pressure with, said incorporated air hose in said re-inflatable containment boom in said mountable spool;

a vacuum and release valve located in the vacuum bypass of said pneumatic control pathway at a point at equal pressure with said incorporated air hose in said re-inflatable containment boom in said mountable spool, adapted to apply negative pressure to, or release pressure from, said incorporated air hose;

a control system adapted to coordinate operator-controlled speed of deployment and recovery of said re-inflatable containment boom with automatically controlled inflation and deflation through said incorporated air hose, comprising:

a control manifold adapted to monitor and control said sensors, said valves, said spool motor, said compressed air source, and said vacuum source;

a control display adapted to providing information to and accepting commands from an operator;

a control manifold antenna and a control display antenna for data communication between said control manifold and said control display;

where said control manifold monitors and adjusts the direction and speed of said spool motor according to operator commands, and monitors and adjusts the positive or negative pressure applied by said pneumatic control pathway to said incorporated air hose in said re-inflatable containment boom in said mountable spool;

where said control manifold continually senses the rate at which said on-board re-inflatable containment boom is being deployed or recovered;

where said control manifold continually senses the positive air pressure at intermediate points between said compressed air source and said pneumatic control pathway at a point at equal pressure with said incorporated air hose, and adjusts the air pressure at said intermediate points by controlling said valves regulating positive air pressure and flow in a stepping-down high-to-low pressure sequence;

where said control manifold continually senses the air pressure in said pneumatic control pathway at a point at equal pressure with said incorporated air hose, and adjusts the air pressure by controlling said valves regulating positive air pressure and said vacuum and release valve regulating vacuum and pressure release, in order to provide adequate positive or negative pressure and flow for deployment or recovery while avoiding damaging overpressure conditions by releasing excess pressure or applying a vacuum;

where said on-board re-inflatable containment boom system adapts to changing circumstances of atmospheric pressure, air and water temperatures and turbulence, speed of deployment or recovery, and size of boom, and provides updated optimal positive and negative pneumatic pressures to facilitate operation without damage to the boom and without premature or delayed inflation or deflation;

conducting training exercises and system testing of deployment and recovery of said on-board re-inflatable containment boom system;

deploying said on-board re-inflatable containment boom system in the event of an oil spill.

* * * * *